United States Patent Office 3,212,934
Patented Oct. 19, 1965

3,212,934
SILVER OXIDE PALLADIUM ELECTRODE
John J. Lander, Anderson, Ind., and John W. Rhyne, Jr.,
Dayton, Ohio, assignors to General Motors Corporation, Detroit, Mich., a corporation of Delaware
No Drawing. Filed Apr. 10, 1963, Ser. No. 271,889
5 Claims. (Cl. 136—30)

This invention relates to alkaline electrochemical cells and more particularly to such cells comprising a silver positive electrode, a zinc negative electrode, and a potassium hydroxide electrolyte. Batteries of the alkaline cell type are finding increasing use in aerospace applications because of the high energy output per unit of weight or volume in relation to conventional types of battery systems.

In attempting to utilize the maximum capacity of the cell of this type during the discharge and to maintain a relatively uniform voltage the principal obstacle is occasioned by the contribution of divalent silver to the total capacity which tends to limit the availability of the overall capacity of the cell and to cause an undesirably high voltage for a considerable period during the initial phase of discharge. If the capacity is limited to that contributed by non-divalent silver, however, only a small portion of the electrode capacity can be utilized. In order to alleviate the above problems many approaches have been suggested among which are varying the time between charge and discharge, modifying the rate and extent of charge, rate of discharge, and adjusting the electrolyte concentration.

Because of environmental limitations and demands made upon the battery in its common applications, variation in the rate of discharge seems to be the most desirable method of overcoming the problem of voltage fluctuation and to utilize a greater capacity of the cell. Because high current densities adversely affect the cycle life of the cell, the only practical course left open is to change the basic characteristics of the silver electrode.

It is therefore a general object of this invention to provide a means for improving the discharge characteristics of an alkaline battery.

A particular object of this invention is to increase the usable discharge capacity of an alkaline electrochemical cell by incorporating relatively small amount of palladium metal in the silver electrode of the cell.

A further object of this invention is to provide an electrochemical cell having a silver positive electrode wherein palladium is alloyed with the silver.

A still further object of this invention is the improvement of an alkaline electrochemical cell by the provision of a porous silver positive electrode which is impregnated with palladium metal which may be partially alloyed with the silver.

Another object of this invention is to provide a method for making a silver positive electrode for an alkaline battery wherein the electrode is impregnated with palladium metal.

It has been discovered that the inclusion of small percentages of palladium in the silver positive electrode of alkaline electrochemical cells results in increased charge acceptance at the monovalent level and a subsequent decrease in the capacity which appears at the divalent level.

In one embodiment of the invention, alloy sheets of 98.5% silver and 1.5% palladium were employed as positive electrodes, with a high purity silver sheet serving as a control. The electrolyte consisted of potassium hydroxide solution of 1.320 specific gravity. A current density 0.050 amps (8.3 ma./in. sq.) was utilized. An amalgamated zinc strip served as the reference electrode in each cell. After approximately 5 charge-discharge cycles, cells with the alloyed positive electrode showed significant deviation from those with the standard silver electrode by a substantial increase in both the extent of charge acceptance at the monolavent level and the total charge acceptance. The voltage also remained relatively uniform over a greater proportion of the charge-discharge cycle as opposed to the characteristic behavior exhibited by the standard silver-zinc cells.

In a further embodiment of the invention, sintered silver plates were impregnated with 1% palladium by weight according to the following procedure. A solution of 60% palladium chloride was placed in a small beaker and sufficient concentrated ammonium hydroxide solution was added so as to dissolve the resulting precipitate. The solution formed was then mixed with ammonium formate and immediately applied to the sintered plate in a uniform manner. The plate was dried during which time the ammonium formate reduced the palladium solution to palladium metal within the pores of the sintered silver plate. All the plates were then heated at 500° F. for approximately five minutes to decompose the ammonium salt. A number of the plates were additionally heated at 1000° F. for twenty minutes to cause partial alloying of the palladium with the silver.

The two types of porous plates, i.e., those heated at 500° F. alone, and those additionally heated at 1000° F. were cycled in the standard manner as that employed with the solid alloy sheet with the exception that this discharge current of one amp. (0.167 amp./in. sq.) was used. The same type of control plates were used.

By the fifth cycle the capacity of the treated plates substantially exceeded that of the control, apparently due to the higher percentage of the total charge represented by the monovalent voltage capacity. Those cells with the plates that had been heated at 1000° F. showed even more improved results than those that had been treated at 500° F. alone. Similar tests were conducted employing silver plate electrodes containing small proportions of other elements such as tin, gold, selenium, arsenic and others with either no improvement noted or actually deleterious effects upon the performance of the cells.

The results of an ex-ray diffraction analysis of the treated plates support the hypothesis that the presence of the finely divided palladium aids the conversion of silver in the presence of oxygen to form $Ag_2O$ at relatively low temperatures, i.e., an increase in the surface conversion of silver to monovalent silver oxide. Such tests also indicated that the most complete surface oxidation occurred in the plates heated at 1000° F. While such would seem to be a theoretical explanation for the unusual increase in capacity and voltage uniformity obtained, other hypotheses may be advanced without departing from the concept of the invention as defined by the claims.

We claim:
1. An electrochemical secondary battery cell comprising a zinc negative electrode, an alkaline electrolyte, and a silver positive electrode having palladium alloyed with the silver thereof in a range between about 1% and 1.5% by weight of said positive electrode.

2. An electrochemical secondary battery cell comprising a zinc negative electrode, an alkaline electrolyte, and a porous silver positive electrode, said positive electrode being impregnated with between 1% and 1.5% palladium by weight of said positive electrode.

3. A cell as claimed in claim 2 wherein said palladium is at least partially alloyed with the silver.

4. In a silver-zinc alkaline type secondary battery, a positive electrode consisting essentially of silver alloyed with about 1.5% palladium by weight of said electrode.

5. In a silver-zinc alkaline type secondary battery, a porous silver positive electrode containing about 1% palladium by weight of said electrode.

References Cited by the Examiner

UNITED STATES PATENTS

| | | | |
|---|---|---|---|
| 2,319,259 | 5/43 | Peterson | 75—173 X |
| 2,980,749 | 4/61 | Broers | 136—86 |
| 3,017,448 | 6/62 | Cahan | 136—26 |
| 3,062,909 | 11/62 | Reutschi | 136—86 |
| 3,077,507 | 2/63 | Kordesch et al. | 136—86 |
| 3,097,974 | 7/63 | McEvoy | 136—120 |

OTHER REFERENCES

Mellor: Comprehensive Treatise on Inorganic & Theoretical Chemistry, vol. 15, May 1936, pages 597, 620 and 625.

JOHN H. MACK, *Primary Examiner.*

MURRAY TILLMAN, *Examiner.*